(12) United States Patent
Kugelstadt et al.

(10) Patent No.: US 9,771,037 B2
(45) Date of Patent: Sep. 26, 2017

(54) WORK MACHINE, IN PARTICULAR DUMP TRUCK OR TRUCK

(71) Applicant: Liebherr-Mining Equipment Colmar SAS, Colmar (FR)

(72) Inventors: Kai Kugelstadt, Lahr (DE); Adrien Levaray, Colmar (FR); Burkhard Richthammer, Freiburg (DE)

(73) Assignee: Liebherr-Mining Equipment Colmar SAS, Colmar (FR)

( * ) Notice: Subject to any disclaimer, the term of this patent is extended or adjusted under 35 U.S.C. 154(b) by 34 days.

(21) Appl. No.: 14/639,938

(22) Filed: Mar. 5, 2015

(65) Prior Publication Data

US 2015/0251610 A1    Sep. 10, 2015

(30) Foreign Application Priority Data

Mar. 6, 2014    (DE) .................. 10 2014 003 203

(51) Int. Cl.

| | |
|---|---|
| *B60R 16/023* | (2006.01) |
| *B60K 6/405* | (2007.10) |
| *B60K 6/46* | (2007.10) |
| *B60K 11/02* | (2006.01) |
| *B60P 1/28* | (2006.01) |
| *B60S 5/00* | (2006.01) |
| *B62D 33/06* | (2006.01) |
| *B60K 6/40* | (2007.10) |
| *B60K 1/00* | (2006.01) |

(52) U.S. Cl.
CPC ............ *B60R 16/0239* (2013.01); *B60K 6/40* (2013.01); *B60K 6/405* (2013.01); *B60K 6/46* (2013.01); *B60K 11/02* (2013.01); *B60P 1/28* (2013.01); *B60S 5/00* (2013.01); *B62D 33/0617* (2013.01); *B60K 1/00* (2013.01); *B60Y 2200/142* (2013.01); *B60Y 2200/92* (2013.01); *Y02T 10/6217* (2013.01); *Y10S 903/951* (2013.01)

(58) Field of Classification Search
CPC ...... B60R 16/0239; B60K 6/40; B60K 6/405; B60K 6/46; B60K 11/02
See application file for complete search history.

(56) References Cited

U.S. PATENT DOCUMENTS

| | | | | |
|---|---|---|---|---|
| 699,726 A | * | 5/1902 | Turner | ..................... B60H 1/18 180/68.4 |
| 884,117 A | * | 4/1908 | Winton | ..................... B60K 5/12 123/169 PH |
| 1,083,330 A | * | 1/1914 | Link | ..................... B60K 11/04 180/68.4 |

(Continued)

FOREIGN PATENT DOCUMENTS

| | | |
|---|---|---|
| FR | 2854122 A1 | 10/2004 |
| GB | 2196912 A | 5/1988 |

*Primary Examiner* — Hau Phan
*Assistant Examiner* — Jacob Meyer
(74) *Attorney, Agent, or Firm* — McCoy Russell LLP

(57) ABSTRACT

The present disclosure relates to a work machine, in particular in the form of a dump truck or of a truck, having a diesel electric traction drive, comprising at least one internal combustion engine, at least one alternator, at least one set of power electronics as well as at least one electric motor, wherein the power electronics are arranged at least partially in the region of a driven driving axle of the work machine.

14 Claims, 9 Drawing Sheets

(56) References Cited

U.S. PATENT DOCUMENTS

| | | | | |
|---|---|---|---|---|
| 1,110,606 | A * | 9/1914 | Young | F01P 11/02 123/41.14 |
| 1,141,126 | A * | 6/1915 | Leavitt | B62D 61/00 180/21 |
| 5,147,003 | A * | 9/1992 | De Monclin | B60K 6/48 180/14.2 |
| 5,501,289 | A * | 3/1996 | Nishikawa | B60K 1/04 180/65.1 |
| 5,530,323 | A * | 6/1996 | Breitzmann | H02P 5/48 318/41 |
| 6,334,796 | B1 * | 1/2002 | Fromme | H02K 5/225 439/700 |
| 6,898,072 | B2 * | 5/2005 | Beihoff | B60L 11/12 257/692 |
| 7,270,346 | B2 * | 9/2007 | Rowe | B60G 11/30 280/781 |
| 7,274,573 | B2 * | 9/2007 | Sevakivi | H05K 7/1432 211/183 |
| 7,455,136 | B2 * | 11/2008 | Pleune | B60K 11/04 165/41 |
| 7,950,481 | B2 * | 5/2011 | Betz | B60K 6/46 180/6.44 |
| 8,155,834 | B2 * | 4/2012 | Murahashi | B60B 11/06 180/339 |
| 8,276,694 | B2 * | 10/2012 | Stervik | B60K 6/26 180/65.22 |
| 8,324,846 | B2 * | 12/2012 | Marchand | B60L 7/16 318/362 |
| 8,391,008 | B2 * | 3/2013 | Dede | H01L 23/4735 165/104.21 |
| 8,474,560 | B1 * | 7/2013 | Konz | B60R 16/04 180/68.5 |
| 8,490,728 | B2 * | 7/2013 | Kvist | B60K 6/48 180/65.22 |
| 8,562,472 | B2 * | 10/2013 | Shinohara | F16H 57/0479 475/159 |
| 8,672,069 | B2 * | 3/2014 | Cherney | B60K 6/46 180/24.07 |
| 8,704,401 | B2 * | 4/2014 | Kato | B60L 11/1887 307/9.1 |
| 8,884,451 | B2 * | 11/2014 | Hatanaka | B60W 10/08 290/40 C |
| 8,950,526 | B2 * | 2/2015 | Bullock | B60K 6/46 180/54.1 |
| 9,108,497 | B2 * | 8/2015 | Harrison, III | B60K 1/04 |
| 9,145,065 | B2 * | 9/2015 | Knoblauch | B60K 1/04 |
| 9,248,731 | B2 * | 2/2016 | Soma' | B60K 6/26 |
| 9,389,145 | B2 * | 7/2016 | Andreae | G01M 15/102 |
| 9,415,722 | B2 * | 8/2016 | Masutani | B60R 1/00 |
| 9,540,788 | B2 * | 1/2017 | Naito | B60K 1/00 |
| 9,568,608 | B2 * | 2/2017 | Ono | G01S 17/936 |
| 2002/0061803 | A1 * | 5/2002 | Aoki | B60K 6/44 477/3 |
| 2004/0134699 | A1 * | 7/2004 | Shimizu | B60K 1/04 180/68.5 |
| 2005/0052080 | A1 * | 3/2005 | Maslov | B60L 8/00 307/10.1 |
| 2008/0221741 | A1 * | 9/2008 | Pillar | A62C 27/00 701/1 |
| 2008/0238140 | A1 * | 10/2008 | Kejha | B60K 6/46 296/181.1 |
| 2009/0266632 | A1 * | 10/2009 | Hill | B60K 1/02 180/68.1 |
| 2010/0025131 | A1 * | 2/2010 | Gloceri | B60G 3/20 180/65.28 |
| 2010/0065356 | A1 * | 3/2010 | Reddy | B60K 1/02 180/65.31 |
| 2010/0307846 | A1 * | 12/2010 | Kvist | B60K 6/48 180/65.22 |
| 2011/0079454 | A1 * | 4/2011 | Maguire | B60K 6/442 180/65.25 |
| 2012/0116641 | A1 * | 5/2012 | Crosman, III | B60K 6/46 701/84 |
| 2013/0194763 | A1 * | 8/2013 | Yoon | B60R 16/0238 361/752 |
| 2013/0240279 | A1 | 9/2013 | Casey et al. | |
| 2013/0294040 | A1 * | 11/2013 | Fukumasu | H02M 1/44 361/752 |
| 2013/0328393 | A1 * | 12/2013 | Bullock | B60K 6/46 307/10.1 |
| 2015/0246642 | A1 * | 9/2015 | Vernickel | B60P 1/283 280/166 |
| 2015/0251610 | A1 * | 9/2015 | Kugelstadt | B60K 6/405 298/17 R |
| 2015/0251611 | A1 * | 9/2015 | Richthammer | B60K 6/46 180/65.245 |
| 2015/0352943 | A1 * | 12/2015 | Hoffmann | B60K 11/02 180/65.21 |
| 2015/0352944 | A1 * | 12/2015 | Hoffmann | B60K 6/20 180/65.21 |
| 2015/0355333 | A1 * | 12/2015 | Ono | G01S 17/936 356/4.01 |
| 2016/0009183 | A1 * | 1/2016 | Levaray | B60L 11/02 290/45 |
| 2016/0229293 | A1 * | 8/2016 | Seo | B60K 6/52 |

\* cited by examiner

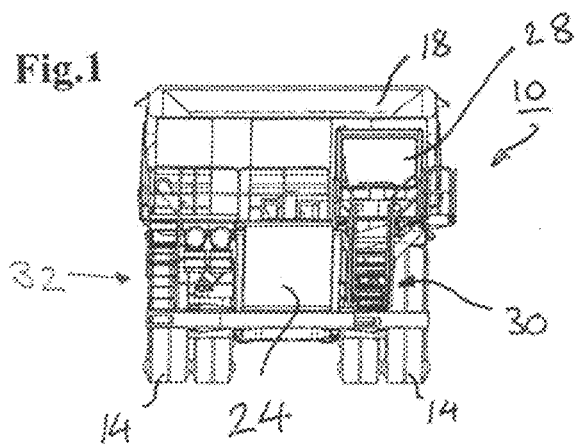
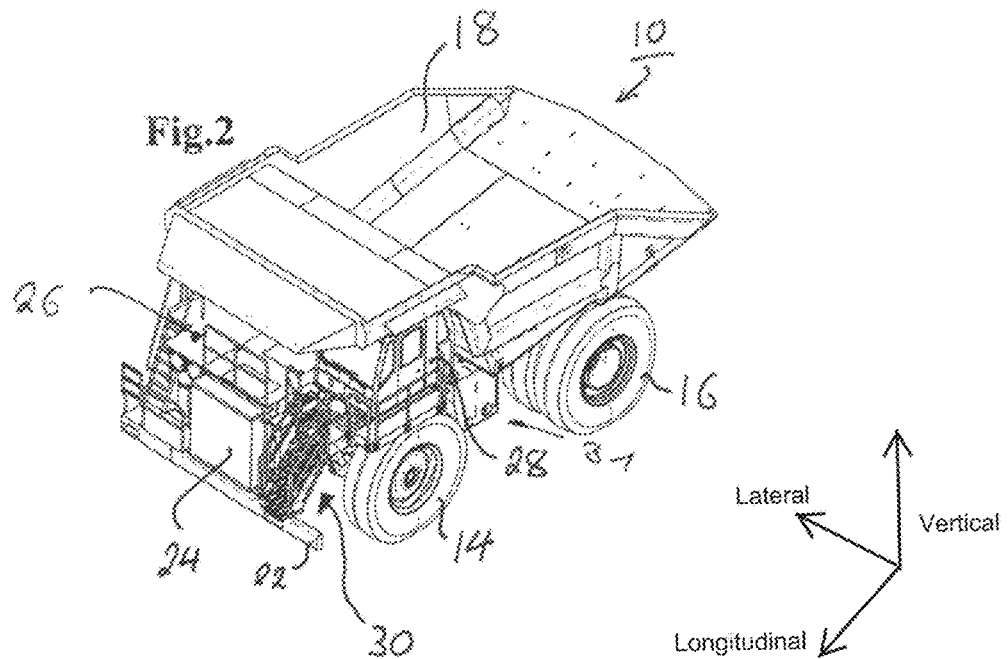

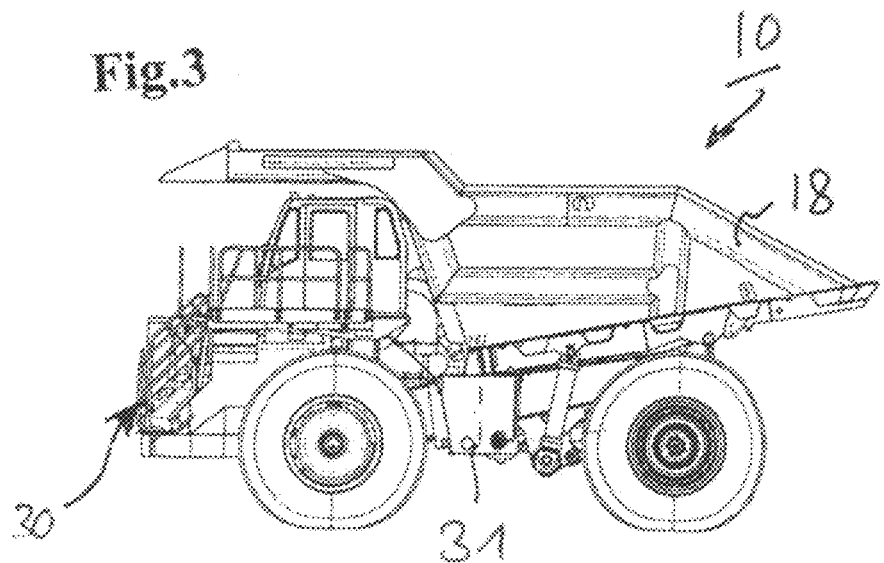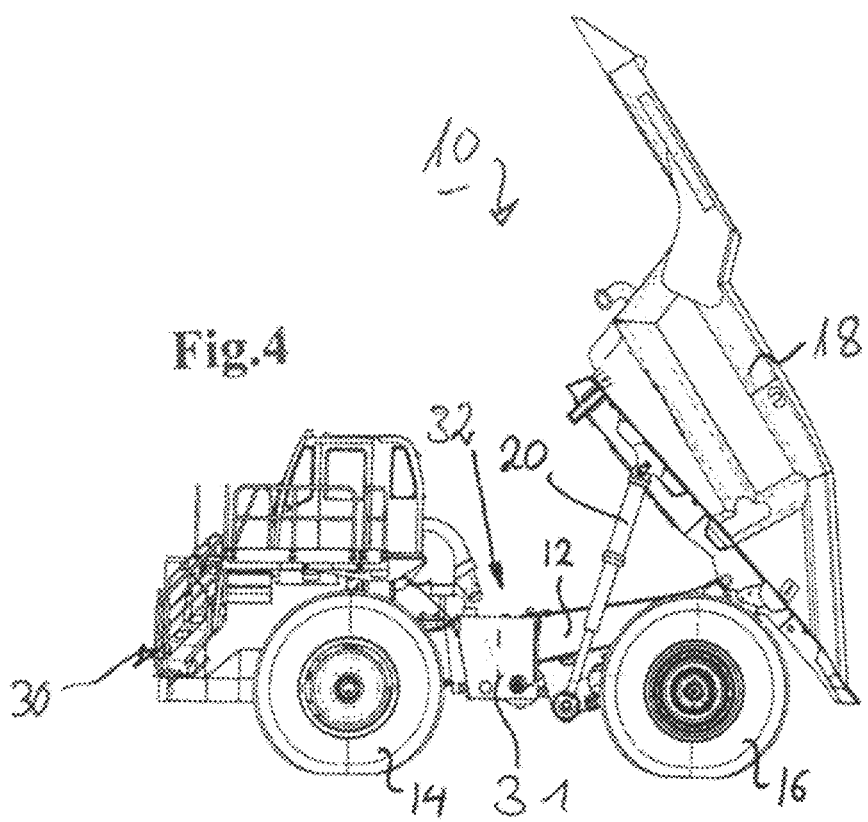

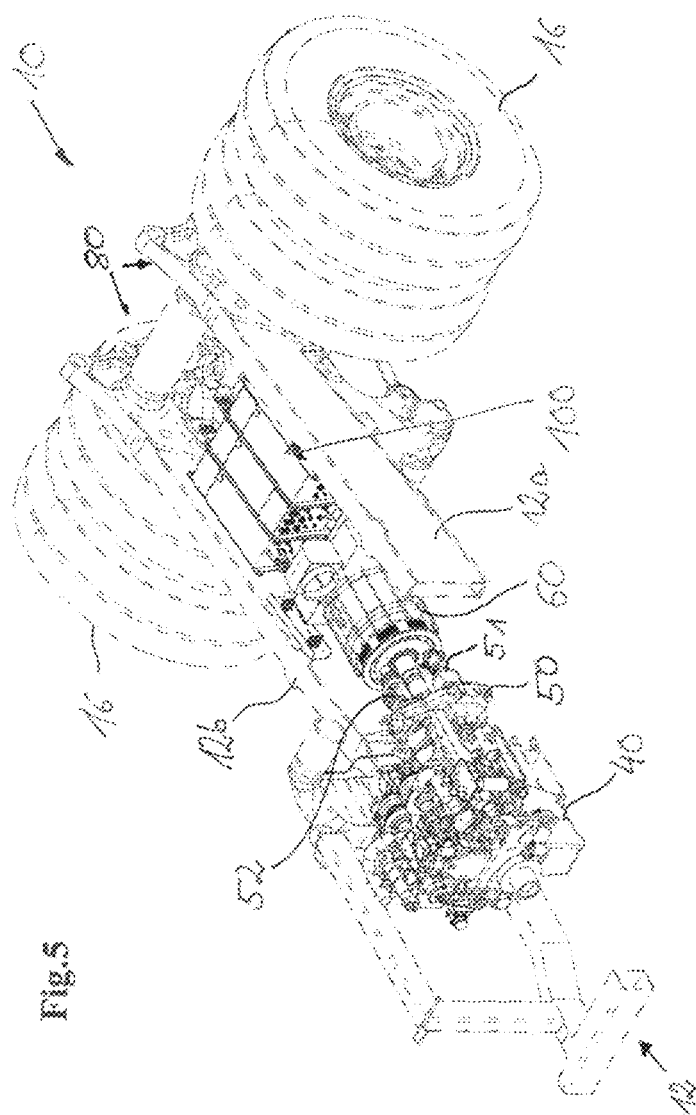

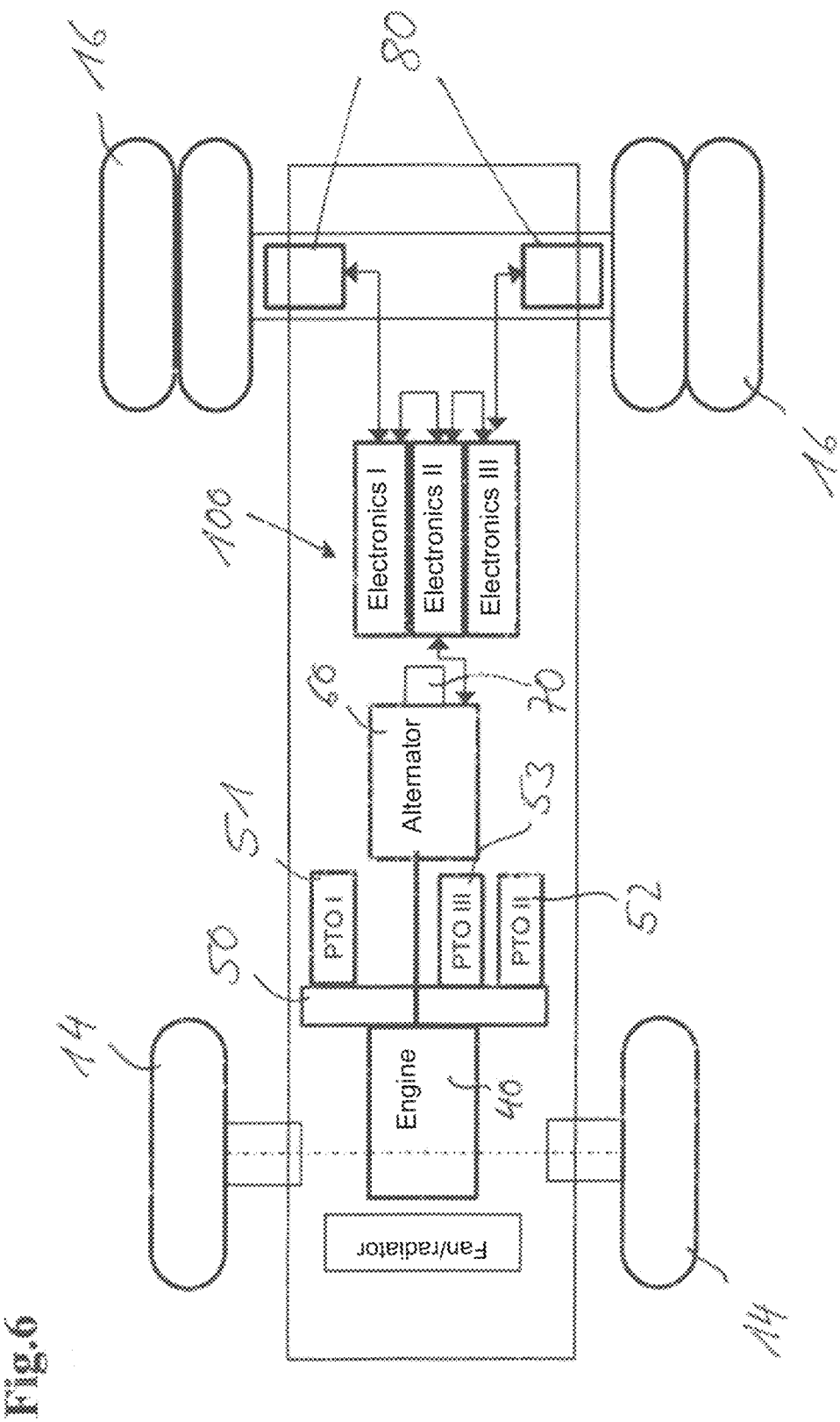

WORK MACHINE, IN PARTICULAR DUMP TRUCK OR TRUCK

CROSS REFERENCE TO RELATED APPLICATION

This application claims priority to German Patent Application No. 10 2014 003 203.5, entitled "Work Machine, In Particular Dump Truck or Truck" filed Mar. 6, 2014, which is hereby incorporated by reference in its entirety for all purposes.

TECHNICAL FIELD

The present disclosure relates to a work machine, in particular in the form of a dump truck or of a truck, having a diesel electric traction drive, comprising at least one internal combustion engine, at least one alternator, at least one set of power electronics as well as at least one electric motor.

BACKGROUND AND SUMMARY

Dump trucks or so-called large dump trucks are predominantly used in coal mining operations or ore mining operations for the transport of the mined coal, minerals and ores. These bulk material dumpers are manufactured in sizes of more than 90 metric tons (t) up to several 100 t in weight and payload so that they have very large dimensions overall.

A diesel electric drive is used as the traction drive, wherein the mechanical energy generated by a diesel engine is converted with the aid of an alternator into electrical energy for the supply of the electric traction drives. The reason for this process is that diesel engines, like all internal combustion engines, can only be operated with ideal efficiency in a very restricted speed range and cannot be started under load. The AC motors for the driving axle can also produce the desired torque in the lower speed range for starting. The internal combustion engine used can be operated continuously in the ideal speed range.

Corresponding power electronics are required for the control of the one or more electric motors and of the alternator. They as a rule include one or more frequency converters to regulate the required speed at the electric motors.

In the known work machines, in particular dump trucks, a large radiator is arranged above the bumper in the part of the work machine at the front in the direction of travel and an upper deck which can be walked on is disposed above it. The operator's cabin is typically arranged laterally above one of the wheels at the level of the upper deck. A switch cabinet which is accessible from the upper deck and which includes the required power electronics for the control or regulation of the alternator and of the driven electric motors is installed next to the operator's cabin on the upper deck. The alternator or the electric motors themselves are, on the other hand, installed in the vehicle frame, with the electric motors optionally being integrated into the driven rear axle and the alternator being mounted in the proximity of the internal combustion engine.

Due to the large dimensions of the work machine, long line paths are necessary to connect the alternator to the power electronics or the power electronics to the electric motors. The required cable harness consequently has to be conducted from the alternator in the vehicle frame for several meters upwardly up to the upper deck of the vehicle and from there back into the vehicle frame to the driven rear axle.

However, the long line paths increase the effort for the cabling. The huge line length furthermore promotes the likelihood of electromagnetic interference, in particular between the power lines and the signal lines for transmitting the control signals to the alternator and to the electric motor.

The object of the present disclosure deals with an alternative design of the diesel electric drive train which can overcome the above-named problems.

This object is achieved by a work machine in particular in the form of a dump truck or of a truck, having a diesel electric traction drive, comprising at least one internal combustion engine, at least one alternator, at least one set of power electronics as well as at least one electric motor. Starting from this, it is proposed in accordance with the present disclosure to arrange the power electronics or at least some of the power electronics in the region of a driven driving axle of the work machine. The work machine may include various of the features of work machines described herein, such as an upper deck, an operator cabin, etc., positioned as described above herein.

A decisive shortening of the required line paths between the power electronics and the electric motor is achieved by the arrangement of the power electronics in the region of the driven driving axle and/or in the region of the electric motors to be supplied with energy. The power electronics are in particular not installed on the upper deck of a mining truck, but instead below the upper deck, such as near the ground in the region of the driven vehicle axle. Not only a service-friendly access to the power electronics hereby results, but the required line paths between the electrical components are also shortened, whereby the likelihood for electromagnetic interference is minimized. In addition, the risk for the operating personnel is further reduced since the power electronics no longer lie in the danger area of the operator's cabin on the upper deck.

The at least one alternator, the power electronics and the at least one electric motor are particularly arranged behind one another at the vehicle in the direction of travel, optionally at the vehicle frame. Not only particularly short line paths thereby result between the electric motor and the power electronics, but also between the alternator and the power electronics. The already above-described advantages of the arrangement in accordance with the present disclosure are further optimized. An installation of the power electronics at least partially between the alternator and the driven driving axle is possible.

The vehicle frame typically comprises at least two frame beams which extend in parallel and which extend at least sectionally in parallel in the longitudinal direction of the vehicle. The power electronics can ideally be mounted between the two frame beams. The installation between the vehicle frame beams provides additional protection for the power electronics. In addition, this installation location is characterized by good service friendliness since the region is easily accessible from the ground and no other components of the work machine block access.

Alternatively, the power electronics can also be installed at least partially at the outside at the vehicle frame, i.e. at the outside at the vehicle beams. It is also conceivable that some of the power electronics are fastened between the vehicle beams and some others are fastened at the outside at at least one vehicle beam. There is the possibility that a respective component of the power electronics is installed both on or at the left vehicle beam and on or at the right vehicle beam.

The power electronics can be integrated in one part within a common housing which is selectively fastenable between the vehicle beams of the vehicle frame or at the outside at one of the vehicle beams. It is also conceivable that the power electronics have a modular design, i.e. the power electronics comprise two or more functional modules each having an encapsulated housing. In this case, a common arrangement in the vehicle frame, i.e. between the vehicle beams or a common arrangement at the outside at the vehicle frame is conceivable. At the same time, an installation of a first functional module in the frame between the frame beams and the fastening of the second or of a further functional module at the outside at the frame are conceivable.

Further numerous installation possibilities for the individual functional modules of the power electronics are naturally conceivable which cannot be exclusively listed here. The gist of the present disclosure, however, comprises the distance of the power electronics, i.e. at least of some of the functional modules, from the alternator and/or from the driven driving axle being dimensioned as short as possible to achieve the advantages in accordance with the present disclosure.

A particular advantage of the technical solution in accordance with the present disclosure results in that the power electronics are easily accessible, optionally with an upwardly tilted skip of the work machine, so that service work, installation work and dismantling work are simplified. During regular operation, the power electronics are protected from external environmental influences, on the one hand, by the skip and, on the other hand, by the vehicle frame. The skip is tilted up for the installation and a simple access from above close to the ground is achieved.

It is conceivable for this purpose that one or more lifting gears are provided at the work machine, in particular in the region of the skip, particularly at the front lower edge of the skip, to be able to take up the power electronics or individual functional modules. A simple installation possibility or dismantling possibility for the power electronics or for individual components of the power electronics can be provided with the aid of the lifting gear. In addition to the vertical lifting movement, the lifting gear can additionally provide a horizontal movement of the load to be able to easily move the taken up functional modules.

Further advantages and properties of the work machine in accordance with the present disclosure result from the embodiments shown in the drawings.

BRIEF DESCRIPTION OF THE FIGURES

FIGS. 1-4 show a plurality of representations of the dump truck in accordance with the present disclosure.

FIG. 5 shows a perspective detailed view of the drive train of the dump truck in accordance with the present disclosure.

FIGS. 6-8 show schematic representations of the drive train in accordance with the present disclosure in accordance with different embodiments;

DETAILED DESCRIPTION

Figure 7:
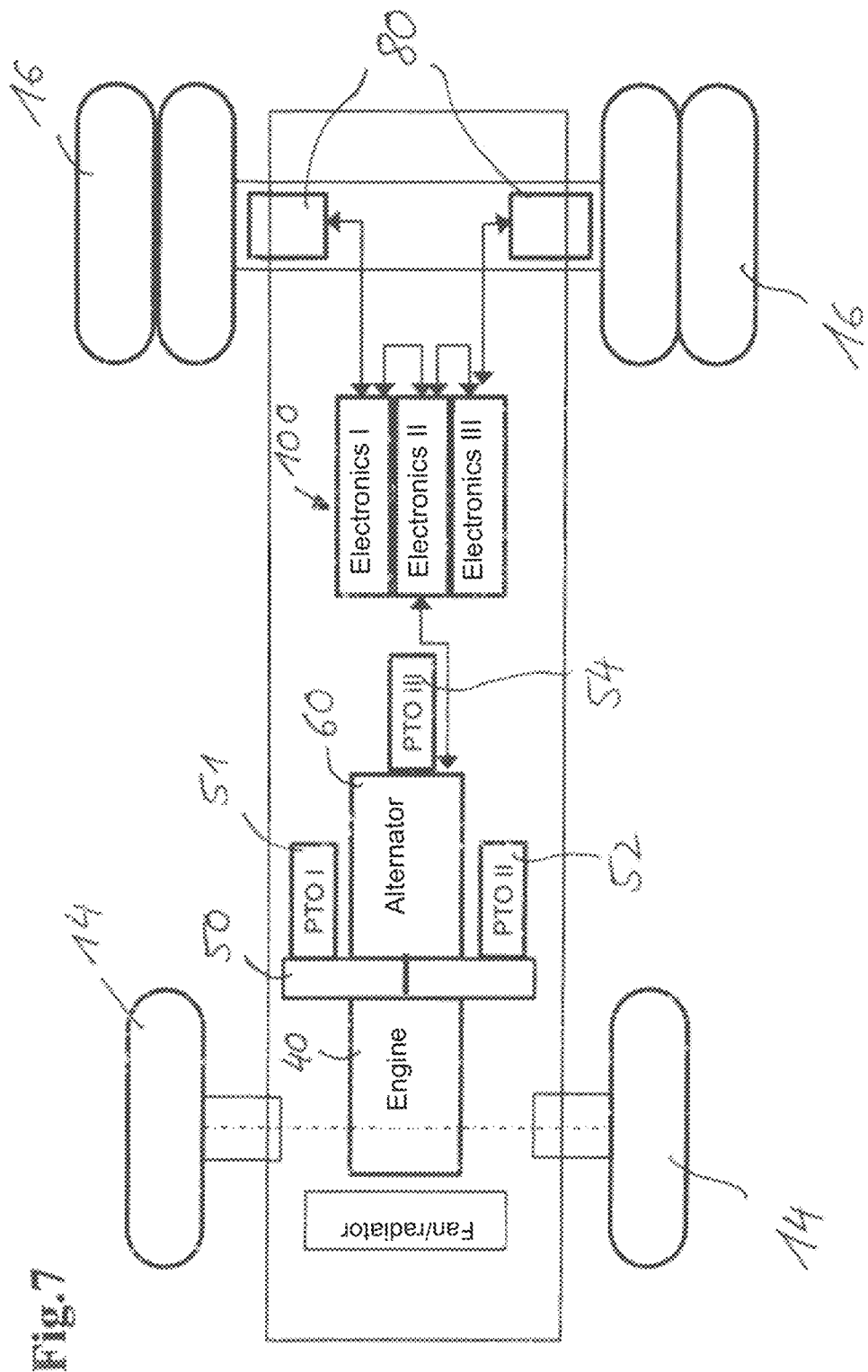

A dump truck 10 is shown in FIGS. 1 to 4. It is here a so-called large dump truck such as is used in ore mines. Front wheels 14 and rear wheels 16, driven via electric motors not shown in more detail, are supported at a rigid frame 12. The rear wheels 16 are designed with dual tires.

A skip 18 is pivotally connected to the frame 12 and is pivotable via hydraulic lifting cylinders 20 provided at both sides at the vehicle. The vehicle 10 is bounded by the bumper 22 in the region of the vehicle 10 at the front in the direction of travel. A radiator module 24 is arranged above the bumper 22. An upper deck 26 in turn extends over the width of the dump truck 10 above the radiator module 24. An operator's cabin 28 is arranged at a side of the upper deck 26. In the embodiment shown here, the operator's cabin 28 is positioned at the side of the upper deck 26 at the left in the direction of travel. The operator's cabin 28 thus lies above the front left wheel 14.

The dump truck 10 comprises a dielectric drive which is easily recognizable in the perspective detailed view of the vehicle frame 12 in FIG. 5. The drive comprises the diesel engine 40 which is mounted at the vehicle frame 12 in the front region viewed in the direction of travel. The internal combustion engine 40 is in particular seated in the region of the front axle 14 beneath the upper deck 26 and the operator's cabin 28. The required fuel tank is received between the front wheel axle and the back wheel axle 14, 16 at the frame 12 at the left vehicle side in the direction of travel.

The internal combustion engine 40 drives the alternator 60 mechanically to generate the required electrical energy for the electrical traction drive. Two AC motors 80, which are integrated to the left and right in the rear wheel axle 16, serve as the traction drive. The use of separate motors per vehicle side of the rear axle 16 optimizes the cornering and maneuvering since different speeds can be selected for the driven wheels. Power electronics 100 with the required power components such as frequency converters, etc. are available for the control or regulation of the electric motors 80 and of the alternator 60.

Numerous secondary consumers of the dump truck are no longer driven electrically by the generated energy of the alternator 60, but are instead hydraulically supplied. Secondary consumers are, for example, the hydraulic lifting cylinders 20, the drive steering of the dump truck 10, which is likewise hydraulically implemented, and one or more hydraulic fan motors for cooling the electric motors 80, the power electronics 100, the alternator 60 and any other components.

The required hydraulic oil for the secondary consumers is provided by the hydraulic tank 32 which is positioned at the side of the vehicle 10 disposed opposite the fuel tank 31.

In accordance with the detailed view of FIG. 5, the vehicle frame 12 comprises the two longitudinal frame beams 12a, 12b which extend in parallel and at whose center the total vehicle drive train is supported. In the embodiment shown, a pump transfer case 50 is mounted directly at the engine 40 at the rear in the region of the motor shaft. The transfer case comprises a continuous shaft which is connected at the output side via the Cardan shaft 55 to the alternator 60. The output power is thereby transferred to the alternator 60 almost without loss.

The transfer case 50 furthermore provides a plurality of power takeoffs (PTOs) 51, 52 via which a small portion of the engine output power is branched off and is used for the drive of the secondary consumers. In the embodiment variant of FIG. 5 shown, it has proved to be advantageous that the Cardan shaft 55 only serves the provision of the required torque to the alternator 60. The load of the transfer case 50 does not contact the Cardan shaft 55.

The power of the internal combustion engine 40, in particular in the high-power engines for dump trucks, causes high vibrations which can be transmitted to the alternator 60 via the Cardan shaft 55. As a result of the design, the alternator 60 is prone to any vibrations so that an additional clutch is integrated between the alternator 60 and the diesel engine 40. A clutch having an integrated torsion vibration damper is in particular directly integrated into the transfer case 50.

The shown embodiment of FIG. 5 creates additional construction space at the end of the alternator so that a resolver/rotary encoder 70 has space between the power electronics 100 and the alternator 60 (see FIG. 6). The available construction space allows the use of conventional resolvers 70 which can be installed without any complex/expensive new design or modification. Additional development costs and productions costs can thereby be saved.

The assembly of the drive components 40, 50, 60 at the frame linkage takes place by means of fastening clamps. In the representation in accordance with FIG. 5, the fastening means of the internal combustion engine 40 additionally have to support the weight of the transfer case 50. The fastening means of the alternator 60 are welded laterally to fasten the alternator to the longitudinal beams 12a, 12b in the region between them.

For clarity, the embodiment in accordance with FIG. 5 is shown again schematically in FIG. 6. The transfer case 50 comprises a third power takeoff in addition to the power takeoffs 51, 52 visible in FIG. 5. A hydraulic pump for the provision of the required hydraulic pressure for operating the lifting cylinder 20 is driven, for example, via the first power takeoff 51. The second power takeoff 52 drives the pump for the hydraulic steering, whereas a further hydraulic pump is coupled to the third power takeover 53 for exerting pressure on one or more hydraulic fan motors or other hydraulic consumers. The representations of FIGS. 5 and 6 admittedly show a total of three power takeoffs, but embodiments having fewer or more power takeoffs are conceivable as long as the required alternator power can be provided. The individual hydraulic pumps are connected to the power takeoffs 51, 52, 53 via spur wheel sections.

It should be appreciated the FIGS. 1-5 are each drawn approximately to scale indicating relative dimensions and positioning of components with respect to each other. Further, components depicted as directly coupled without other components therebetween may be so-coupled in one example. Further, the lack of components or elements in the figures can, in one example, indicate that no such components are positioned in such spaces. Additionally, components connected only with each other may be so connected in one example, without additional conditions, whereas elements not coupled to each other may be so configured, in one example. Further, the figures illustrate the vehicle with respect to vertical where the vehicle is on a flat surface, where the longitudinal axis passes perpendicular to vertical along a back to front direction of the vehicle, and perpendicular to lateral along a side to side direction of the vehicle. Further, the figures depict various example regions as described.

Figure 8:
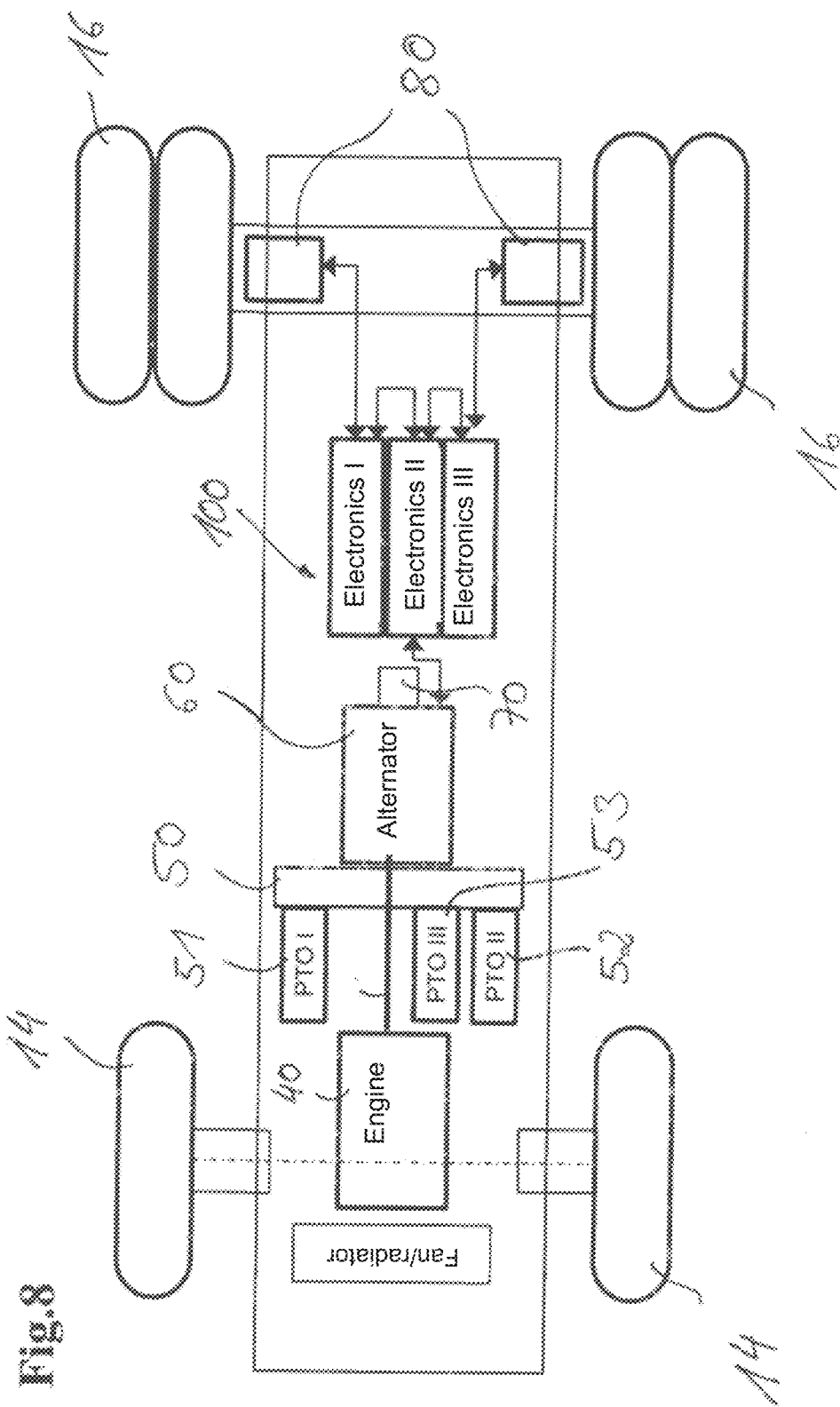

Alternatively to the embodiment of FIGS. 5 and 6, the transfer case 50 can also be arranged directly at the alternator 60 as can be seen from FIG. 8, with the assembly then taking place in mirror-inverted manner to the FIGS. 5 and 6 at the input of the alternator. The connection between the engine output shaft and the transfer case is achieved via the additional Cardan shaft 55. In this respect, the Cardan shaft 55 has to provide the total required power for the drive of the alternator 60 and of the transfer case 50. The alternative embodiment has the advantage that the internal combustion engine 40 can be changed more simply since only an end coupling of the Cardan shaft 55 is necessary for the dismantling. In addition, the required fastening means of the internal combustion engine do not have to support the additional weight of the transfer case 40 at the frame 12 of the dump truck 10. An additional support of the alternator can furthermore take place via the transfer case 40.

A further alternative embodiment can be seen from FIG. 7, in accordance with which the pump transfer case 50 is directly connected to the internal combustion engine 40 and the alternator 60. An additional Cardan shaft can be led through the alternator 60 as required to allow the coupling of a further power takeoff 54 at the output of the alternator 60.

In the known solutions from the prior art, the power electronics for a diesel electric drive of a dump truck were positioned in a large switch cabinet on the upper deck next to the operator's cabin. However, due to the high electrical power generated, a high potential danger for the operating personnel emanates from the power electronics. The switch cabinet with integrated power electronics may therefore only be operated or opened and serviced by especially trained technicians.

Due to the enormous dimensions of the dump truck 10, very long line paths have to be accepted by the previous arrangement of the switch cabinet on the upper deck for the electrical connection of the power electronics to the alternator, on the one hand, and the electric motors integrated in the rear axle, on the other hand. The required cable harness consequently first has to be conducted from the alternator in the vehicle frame for several meters upwardly up to the upper deck of the vehicle and has to be laid from there back into the vehicle frame to the rear driven rear axle.

Long supply paths, however, increase the effort for the cabling. The huge line length furthermore promotes the likelihood of electromagnetic interference, in particular between the power lines and the signal lines for transmitting the control signals to the alternator and to the electric motor.

The design of the dump truck 10 in accordance with the present disclosure now differs from the previous solutions known from the prior art and instead proposes not positioning the power electronics 100 on the upper deck 26, but rather as close as possible in the region of the diesel electric drive train, such as in the region of the driven rear axle 16 in direct proximity to the electric motors 80 and/or to the alternator 60, for example wholly within tops and bottoms of respective wheels in a vertical direction. A possible installation position of the power electronics 100 is shown in FIG. 5. A much lower spacing from the alternator 60 and from the electric motors 80 in the driven rear axle 16 results by the integration of the power electronics 100 in the vehicle frame 12. Comparatively short line paths and signal paths are thereby achieved, unwanted crosstalk between the lines is minimized and interfering influences on the control signals are thus reduced. The total cabling of the diesel electric drive is further much simpler in design than with the solutions shown in the prior art.

Figure 9:
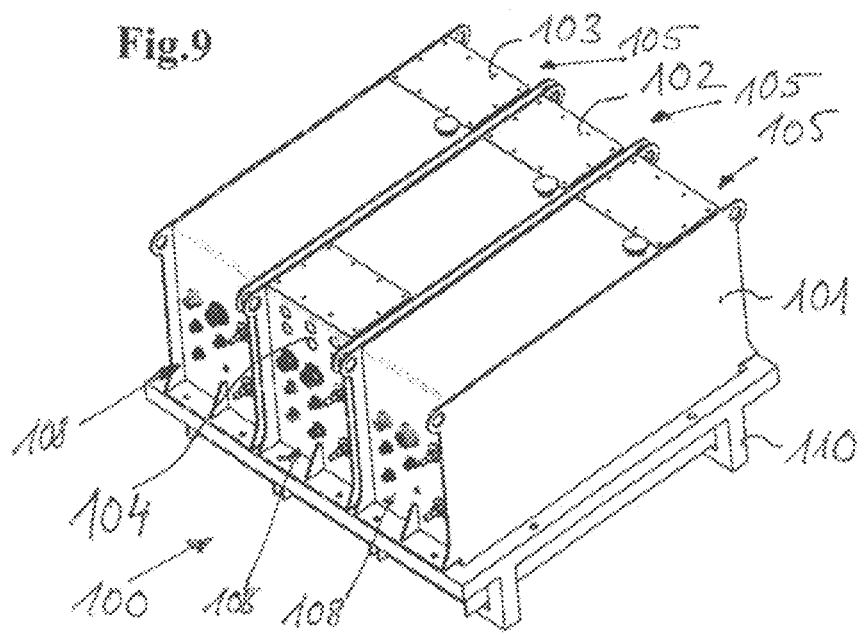
FIG. 9 shows a detailed view of the power electronics.

The total power electronics 100 are furthermore not accommodated in a common housing (switch cabinet), but instead have a modular design. In accordance with the exemplary representation of FIG. 9, the power electronics 100 are composed of a total of three separate functional modules 101, 102, 103 which are each accommodated in their own encapsulated housings. FIG. 9 shows the box-like functional modules 101, 102, 103 next to one another in a row on a receiving frame 110. The encapsulated housings are prepared in a solid construction and thus offer protection from external influences such as water, dust and stone-chipping.

The power electronics or the individual functional modules 101, 102, 103 are mounted in the region of the driven rear axle 16 between the two longitudinal beams 12a, 12b of the vehicle frame 12, i.e. are fastened to the longitudinal beams 12a, 12b with the aid of the used fastening frame 110. The front and rear sides of the individual functional modules 101, 102, 103, i.e. the sides of the box shape facing the alternator 60 and the electric motors 80, comprise a plurality of electrical terminals 104, 105 for a mutual electric coupling of the functional modules 101, 102, 103 and for connecting the alternator 60 and the electric motors 80.

The middle functional module 102, for example, comprises all the required control components for the control/regulation of the alternator 60. The alternator 60 is therefore coupled to the power electronics via the terminals 104 on the front side of the functional module 102. The functional modules 101, 103 in contrast comprise the required frequency converters for the feed of the electric motors 80, with a respective functional module 101, 103 being assigned to exactly one electric motor 80. The connections between the functional modules 101, 102, 103 are then established via the available terminals 105 on the rear side of the functional modules 101, 102, 103, i.e. the side facing the electric motors 80. The connection with the motors 80 is likewise achieved via the terminals 105. The cabling is not shown in FIG. 5, but is schematically indicated in FIGS. 6 to 8.

In addition to the electric terminals 104, 105, external terminals 108 for an integrated liquid-based cooling of the power modules are available on the front side. Each encapsulated housing of the functional modules 101, 102, 103 consequently comprises its own integrated cooling.

The representation of FIG. 5 shows a common arrangement of the available functional modules 101, 102, 103 of the power electronics 100 between the longitudinal beams 12a, 12b of the vehicle frame 12. This arrangement corresponds to the schematic representation in accordance with FIG. 11A which shows the vehicle frame 12 in a plan view.

Figure 11A:
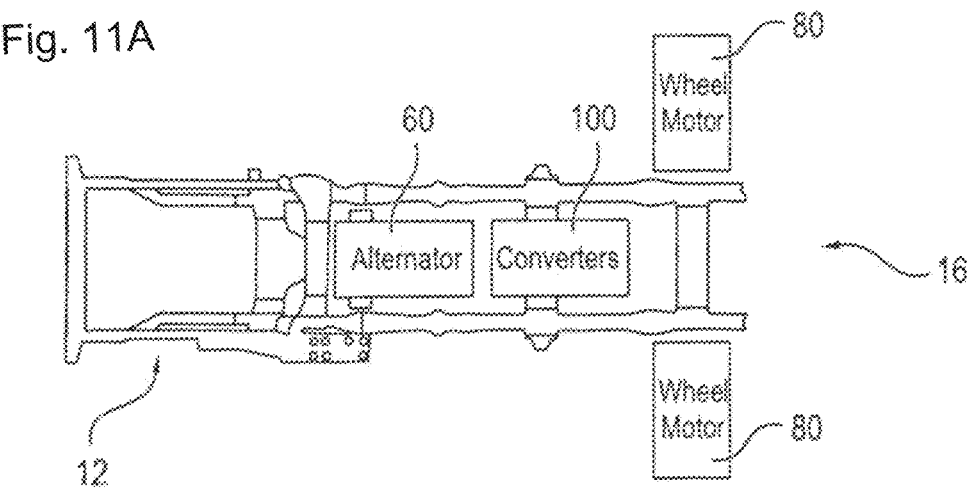
FIGS. 11A-11C show different schematic representations of the vehicle frame with different installation positions of the power electronics in accordance with the present disclosure.
Figure 11B:
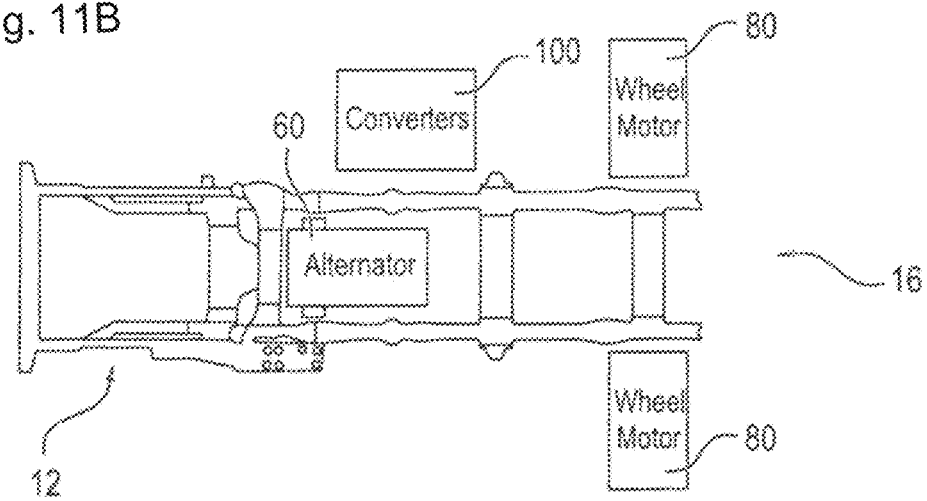

An alternative arrangement can be seen from FIG. 11B, according to which the power electronics 100 is no longer mounted between the beams 12a, 12b, but rather to the right outside the vehicle beam 12b in the direction of travel. A mounting of the total power electronics 100 on the side to the left viewed in the direction of travel, i.e. at the vehicle beam 12a, is naturally also conceivable.

Figure 11C:
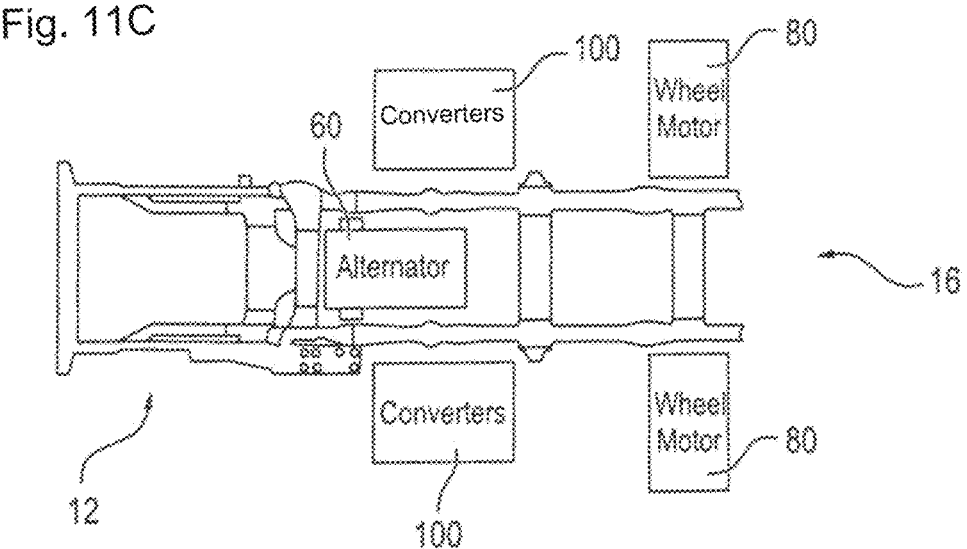

FIG. 11C shows a further possibility, according to which individual functional modules of the power electronics 100 are mounted to the left and right next to the longitudinal beams 12a, 12b. For example, a spread of the functional modules 101, 102, 103 over different mounting positions at the frame is possible in order, for example, to reduce the distance between the functional modules 101, 103 responsible for the electric motors and the respective electric motors 80 as much as possible.

In addition to the shown embodiments of FIGS. 11A to 11C, an arrangement is naturally also conceivable in which some of the power electronics 100 is fastened between the beams 12a, 12b of the vehicle frame 12, whereas a further portion is mounted at the outside.

Figure 10:
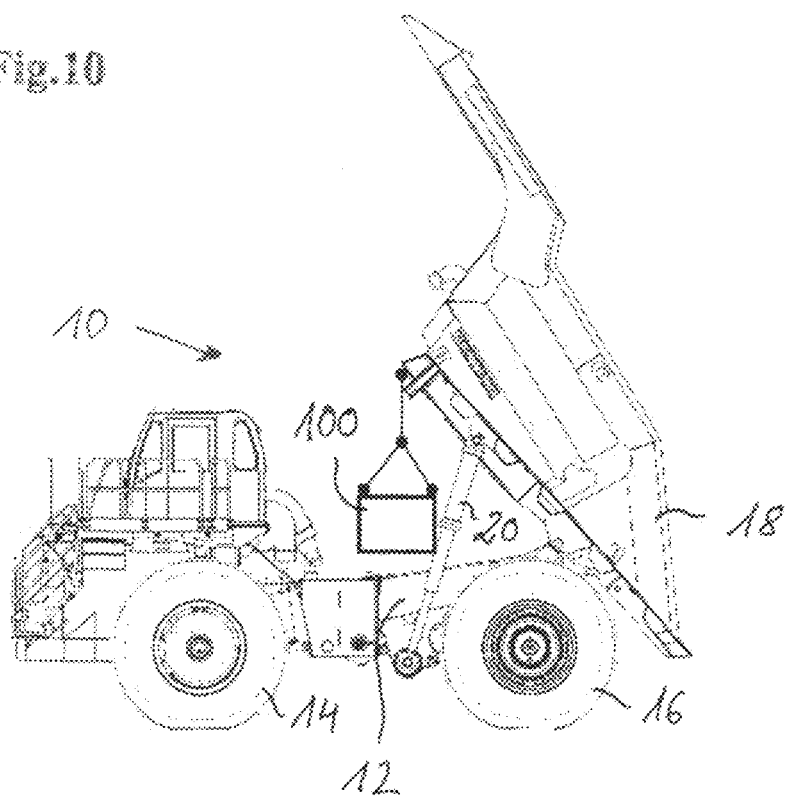
FIG. 10 shows a side view of the dump truck with lifting gear.

FIG. 10 now shows a further advantage of the solution presented. In addition to the already shown technical advantages, a better access for service work, assembly work and dismantling work at the power electronics 100 results due to the installation location of the power electronics 100 close to the ground. Only the skip 18 has to be tilted for the service access to the power electronics (FIG. 10).

The required modules 101, 102, 103 can be removed either individually or in common and no longer have to be moved the long distance from or to the upper deck 26 of the dump truck. It is in addition intended that on a defect of the power electronics, individual modules 101, 102, 103 can be directly replaced and do not have to be repaired on site. Especially trained technicians on site can be dispensed with and the down time of the machine 10 due to a defect can be minimized.

Alternatively, as shown in FIG. 10, at least one lifting gear can be fastened to the lower edge of the skip 18 to be able to take up the power electronics 100 or individual functional modules 101, 102, 103 for assembly/dismantling. The lifting gear used ideally allows, in addition to the vertical lifting movement, a horizontal movement for moving the load taken up.

It is additionally pointed out that the advantageous arrangements of the power electronics 100 at the vehicle frame 12 (FIGS. 11A-11C) not only apply to a modular design of the power electronics, but also to a conventional design in a single housing. A modular-like design of the power electronics is equally conceivable if they are mounted on the upper deck 26 or elsewhere at the vehicle 10.

Figure 12:
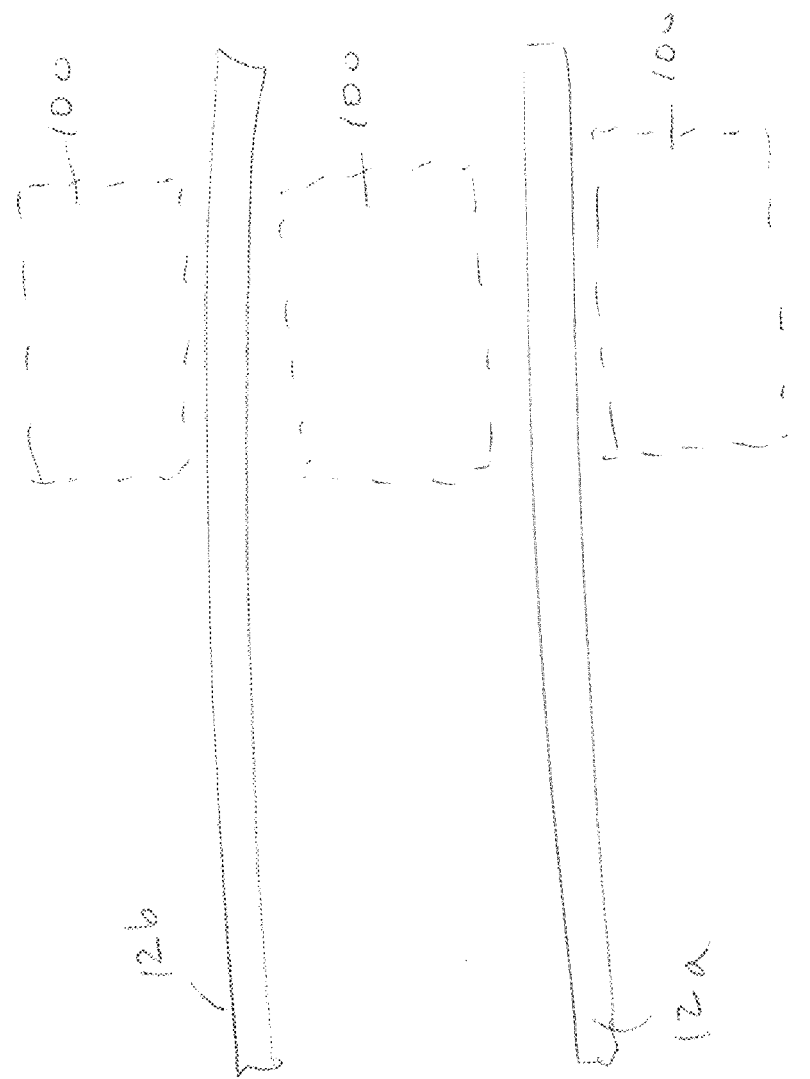
FIG. 12 shows an example of the vehicle frame rails 12a, 12b from vertically above, with various locations.

FIG. 12 shows an example of the vehicle frame rails 12a,b from vertically above, with various locations for example power electronics 100. The power electronics 100 may be mounted to one side of the rails, between the rails, and/or to the other side of the rails. For example, in one example, two housings of power electronics 100 are each mounted at an outside at the vehicle frame.

In one example embodiment, a system, comprises a work machine having a diesel electric fraction drive including at least one internal combustion engine, at least one alternator, at least one set of power electronics as well as at least one electric motor, wherein the motor is coupled to a driving axle driving a wheel of the work machine, and wherein the power electronics are arranged adjacent the driving axle of the work machine between parallel frame rails of the work machine. The engine may be longitudinally mounted in the work machine forward of the driving axle, the work machine further having an upper walking deck positioned vertically above the frame rails, the rails each formed as longitudinal beams coupled together to one another. The power electronics may be housed by at least one housing the housing fully between the two rails, where the housing does not extend vertically above a top of the rails along an entire longitudinal length of the housing. The work machine may further include an operator cab, a skip, and/or a radiator module. The radiator module may be positioned at a front of the work machine without any other components forward of the radiator module, the radiator module coupled below the upper deck. At least two power electronics housings may be provided adjacent one another, and where outside side walls of the housings are each adjacent and in face-sharing contact with inner side walls of the respective side rails. The power electronics may be divided into two or more functional modules and at least one of the functional modules has an encapsulated housing. The housing material may at least partially comprise metal. The encapsulated housing may comprises one or more external terminals coupled with electrical cabling to the alternator and/or to further functional modules and/or to one or more electrical traction drives, and wherein the functional modules at least partially comprise an integrated cooling with external terminals on an outer housing side, wherein the electronic components of the power electronics are divided into different functional modules, and wherein frequency converters for each electric motor are accommodated in separate functional modules. At least one functional module may comprise an alternator control or alternator regulator and/or the control/regulator of frequency converters for the electric motors, and wherein a receiving board or frame, is provided for receiving two or more or all functional modules of the power electronics, and wherein the receiving board or frame is releasably connectable to the a vehicle frame of the work machine. At least some of the functional modules or all the functional modules may be mounted between the alternator and the electric motor, in between rails of a vehicle frame.

The invention claimed is:

1. A work machine, having a diesel electric traction drive, comprising at least one internal combustion engine, at least one alternator, at least one set of power electronics as well as at least one electric motor,
   wherein the power electronics are at least partially arranged in a region of a driven driving axle of the work machine,
   wherein the at least one alternator, the power electronics, and the at least one electric motor are arranged behind one another at the work machine in a direction of travel, and at a frame of the work machine,
   wherein the power electronics are arranged at least partially between the alternator and the driven driving axle,
   wherein the power electronics are arranged at least partially between two frame beams of the frame of the work machine, and
   wherein the power electronics are housed by at least one housing, and where outside walls of the at least one housing are adjacent to and in face-sharing contact with inner side walls of respective frame beams.

2. The work machine of claim 1, wherein the work machine is in the form of a dump truck or of a truck.

3. The work machine in accordance with claim 1, wherein the power electronics are divided into two or more functional modules and each functional module has an encapsulated housing.

4. The work machine in accordance with claim 3, wherein the functional modules are arranged in the frame between the frame beams.

5. The work machine in accordance with claim 1, wherein the power electronics are accessible for servicing, installation and/or dismantling with an upwardly tilted skip of the work machine.

6. The work machine of claim 1, wherein the power electronics are housed by a plurality of housings, each housing having a same size and shape, the housings being adjacent to one another.

7. The work machine of claim 6, wherein a long axis of the housings is aligned with the direction of travel.

8. The work machine of claim 7, wherein the power electronics comprise three modules, each module with its own housing in the plurality of housings, wherein a first module is configured to control the at least one alternator, wherein second and third modules comprise frequency converters, the second module configured to provide electric power to a first electric motor of the at least one electric motor, and the third module configured to provide electric power to a second electric motor of the at least one electric motor.

9. The work machine of claim 8, wherein the first module is arranged between the second and third modules.

10. A system, comprising:
    a work machine having a diesel electric traction drive including at least one internal combustion engine, at least one alternator, at least one set of power electronics as well as at least one electric motor, wherein the motor is coupled to a driving axle driving a wheel of the work machine, and wherein the power electronics are arranged adjacent the driving axle of the work machine between parallel frame rails of the work machine,
    wherein at least two power electronics housings are provided adjacent one another,
    wherein the engine is longitudinally mounted in the work machine forward of the driving axle, the work machine further having an upper walking deck positioned vertically above the frame rails, the rails each formed as longitudinal beams coupled together to one another,
    wherein the power electronics are housed by at least one housing, the housing fully between the two rails, where the housing does not extend vertically above a top of the rails along an entire longitudinal length of the housing, and
    wherein the work machine further includes an operator cab, and wherein the power electronics include a first module configured to control the at least one alternator.

11. The system of claim 10, wherein the work machine further includes a skip, and wherein the power electronics further include a second module, different from the first module, comprising frequency converters, the second module configured to provide electric power to the at least one electric motor.

12. The system of claim 11, wherein the work machine further includes a radiator module, and wherein the first and second modules are housed in separate housings, each housing including an integrated cooling system.

13. The system of claim 12, wherein the radiator module is positioned at a front of the work machine without any other work machine components forward of the radiator module, the radiator module coupled below the upper deck.

14. The system of claim 10, where outside side walls of the at least two housings of the power electronics are each adjacent and in face-sharing contact with inner side walls of respective frame rails.

* * * * *